US007681293B2

(12) United States Patent
Lanni et al.

(10) Patent No.: US 7,681,293 B2

(45) Date of Patent: Mar. 23, 2010

(54) PEDESTAL MOUNTED C-FRAME

(75) Inventors: Victor A. Lanni, Ray Township, MI (US); Philip Szuba, Algonac, MI (US)

(73) Assignee: Acument Intellectual Properties, LLC, Troy, MI (US)

( * ) Notice: Subject to any disclaimer, the term of this patent is extended or adjusted under 35 U.S.C. 154(b) by 1096 days.

(21) Appl. No.: 11/337,785

(22) Filed: Jan. 23, 2006

(65) Prior Publication Data

US 2006/0265859 A1 Nov. 30, 2006

Related U.S. Application Data

(60) Provisional application No. 60/680,152, filed on May 12, 2005.

(51) Int. Cl.
*B23P 11/00* (2006.01)

(52) U.S. Cl. ................ 29/432.2; 29/243.53; 29/243.54; 29/524.1; 29/524; 29/525.06

(58) Field of Classification Search .................. 29/428, 29/432.2, 603.17, 603.22, 832, 834, 842, 29/524.1, 524, 525.06, 243.53, 243.54
See application file for complete search history.

(56) References Cited

U.S. PATENT DOCUMENTS

| | | | | |
|---|---|---|---|---|
| 3,315,595 | A | 4/1967 | Moehlenpah et al. | |
| 6,397,654 | B1 | 6/2002 | Moeser | |
| 6,546,613 | B2 * | 4/2003 | Donovan | 29/524.1 |
| 6,606,892 | B2 | 8/2003 | Fischer et al. | |
| 6,655,186 | B2 | 12/2003 | Pfleghar | |
| 6,789,309 | B2 | 9/2004 | Kondo | |
| 6,855,099 | B2 | 2/2005 | Hazlehurst et al. | |
| 6,907,820 | B2 * | 6/2005 | Jin et al. | 100/51 |

* cited by examiner

*Primary Examiner*—David P Bryant
*Assistant Examiner*—Bayan Salone
(74) *Attorney, Agent, or Firm*—Trexler, Bushnell, Giangiorgi, Blackstone & Marr, Ltd.

(57) ABSTRACT

A C-frame for use in association with a fastener setting machine, such as a rivet setting machine. The C-frame is configured such that it can be used as a suspended C-frame or as a pedestal mounted C-frame. Specifically, the C-frame is configured such that it can be easily mechanically mounted on and electrically connected to a pedestal. The pedestal has a docking mechanism and the C-frame has corresponding structure which mates with the docking station to mechanically mount the C-frame to the pedestal. In addition, the pedestal includes an electrical connector which connects to, or mates with, a corresponding electrical connector on the C-frame. Preferably, buttons are provided on both the C-frame and the pedestal and docking the C-frame on the pedestal works to effectively transfer control of the rivet setting machine from the buttons on the C-frame to the buttons on the pedestal.

14 Claims, 5 Drawing Sheets

PEDESTAL MOUNTED C-FRAME

RELATED APPLICATION

Priority Claim

This application claims the benefit of U.S. Provisional Application Ser. No. 60/680,152, filed May 12, 2005.

BACKGROUND

The present invention generally relates to C-frames which are used in association with rivet setting machines to join a component to a workpiece or two or more workpieces together using a self-piercing rivet or similar fastener. The present invention more specifically relates to a C-frame which is configured such that it can be used as a suspended C-frame or as a pedestal mounted C-frame.

The present invention pertains to the process of joining a component to a workpiece or two or more workpieces together using a fastener, such as a self-piercing rivet. When a self-piercing rivet is used, the process is generally performed using a rivet setting machine, and such rivet setting machines are generally known in the art. A portion of a typical rivet setting machine is illustrated in FIG. 1. As shown, a typical rivet setting machine 20 is hydraulically powered and has a generally C-shaped frame 22. The C-frame 22 shown in FIG. 1 is a suspended C-frame, which is generally used when the parts to be worked on are large and heavy. In this case, the C-frame 22 is brought to the work. In contrast, when the parts are smaller and light, it is often easier to keep the tool stationary and bring the work to the tool. In this case, a pedestal mounted C-frame is used. Regardless, as shown in FIG. 1, a typical C-frame 22 has a carrier head 24 which holds the rivets 26 therein prior to their being attached to the workpieces 28, 30. Above the carrier head 24 is a driver 32 which drives the rivets 26 from the carrier head 24 into the workpieces 28, 30. At the opposite end of the C-shaped frame 22, an anvil 34 is attached thereto in alignment with the carrier head 24. The anvil 34 is used to support the workpieces 28, 30 during the riveting process and has a cavity (not shown in FIG. 1) therein which allows for the accommodation of the deformation of the rivet 26 and the workpieces 28, 30 during the riveting process. Specifically, the rivet 26 pierces the first workpiece 28 and the anvil 34 deforms the rivet 26 and accommodates deformation of the second workpiece 30 so that while the rivet 26 is spread to hold the workpieces 28, 30 together in clamped engagement, the rivet 26 does not pierce the second workpiece 30 and, in effect, becomes encapsulated. As a result, the two workpieces 28, 30 become secured together. This process is well known in art and is described, for example, in U.S. Pat. No. 6,546,613, which is hereby incorporated herein by reference in its entirety.

As discussed above, usually a suspended C-frame is used when the parts are large and heavy. In this case, the frame is brought to the work. In contrast, when the parts are smaller and light, it is often easier to keep the tool stationary and bring the work to the tool. In this case, a pedestal mounted C-frame is used.

Currently, if there is a need for a suspended C-frame and a pedestal mounted C-frame, one would have to buy two different machines—one for each type of application. Specifically, one would have to buy a machine that has a C-frame that is designed to be suspended; and another machine that has a C-frame that is designed to be mounted on a pedestal. Not only can buying both machines prove to be expensive, but the machines together consume a lot of space.

OBJECTS AND SUMMARY

An object of an embodiment of the present invention is to provide a C-frame design which can be used by people that have a need for both a pedestal mounted and suspended C-frame system.

Another object of an embodiment of the present invention is to provide a C-frame design which provides that one can buy one C-frame system and get the benefits of two—a suspended C-frame system and a pedestal mounted C-frame system.

Briefly, an embodiment of the present invention provides a C-frame for use in association with a fastener setting machine, such as a rivet setting machine. The C-frame is configured such that it can be used as a suspended C-frame or as a pedestal mounted C-frame. Specifically, the C-frame is configured such that it can be easily mechanically mounted on and electrically connected to a pedestal. The pedestal has a docking mechanism and the C-frame has corresponding structure which mates with the docking station to mechanically mount the C-frame to the pedestal. In addition, the pedestal includes an electrical connector which connects to, or mates with, a corresponding electrical connector on the C-frame. Preferably, buttons are provided on both the C-frame and the pedestal and docking the C-frame on the pedestal works to effectively transfer control of the rivet setting machine from the buttons on the C-frame to the buttons on the pedestal.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIGS. 2 and 3 illustrate a C-frame which is in accordance with an embodiment of the present invention, wherein FIG. 2 shows a user using the C-frame as a suspended C-frame and FIG. 3 shows a user using the C-frame as a pedestal mounted C-frame;

DESCRIPTION

Figure 1:
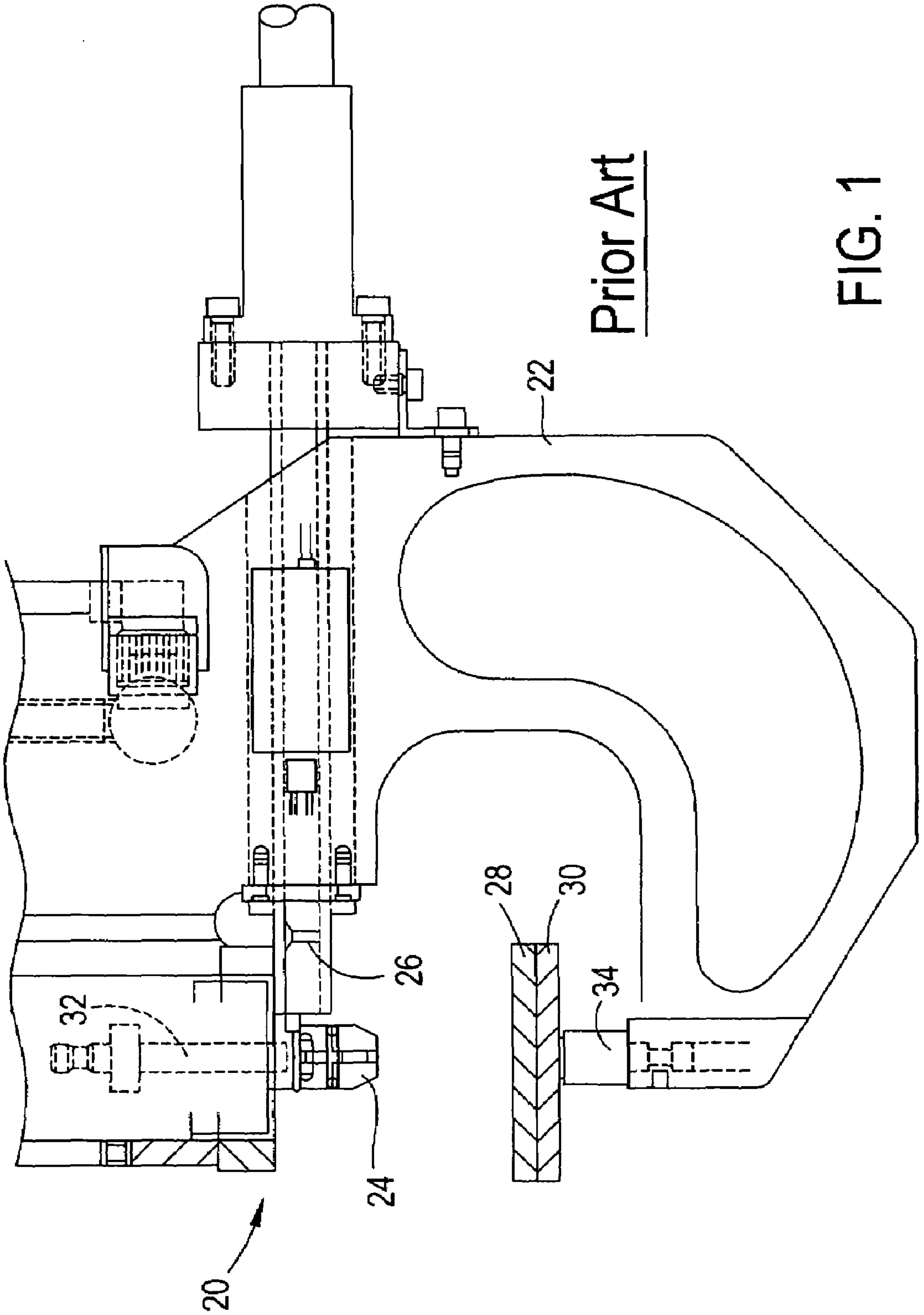
Prior Art FIG. 1
FIG. 1 shows a portion of a typical rivet setting machine, specifically the C-frame thereof.

While the present invention may be susceptible to embodiment in different forms, there is shown in the drawings, and herein will be described in detail, an embodiment thereof with the understanding that the present description is to be considered an exemplification of the principles of the invention and is not intended to limit the invention to that as illustrated and described herein.

An embodiment of the present invention provides a C-frame 40 like that which is shown in FIG. 1 (i.e., C-frame 40, like C-frame 22, includes a carrier head 24, a driver 32, and an anvil 34 as shown in FIG. 1), but which is configured such that it can be used as a suspended C-frame 40 or as a pedestal mounted C-frame 40. More specifically, the C-frame 40 is effectively part of a rivet setting machine 42, wherein the C-frame 40 is suspended from above. However, the C-frame 40 is also configured such that it can be docked to pedestal 44, therefore transferring control of the rivet setting machine 42 from controls 46 on the C-frame 40 to controls 48 on the pedestal 44. As such, the C-frame 40 can be used by people that have a need for both a pedestal mounted and suspended C-frame 40 system. In other words, the C-frame design provides that one can buy one C-frame system and get the benefits of two—a suspended C-frame system and a pedestal mounted C-frame system.

Figure 2:
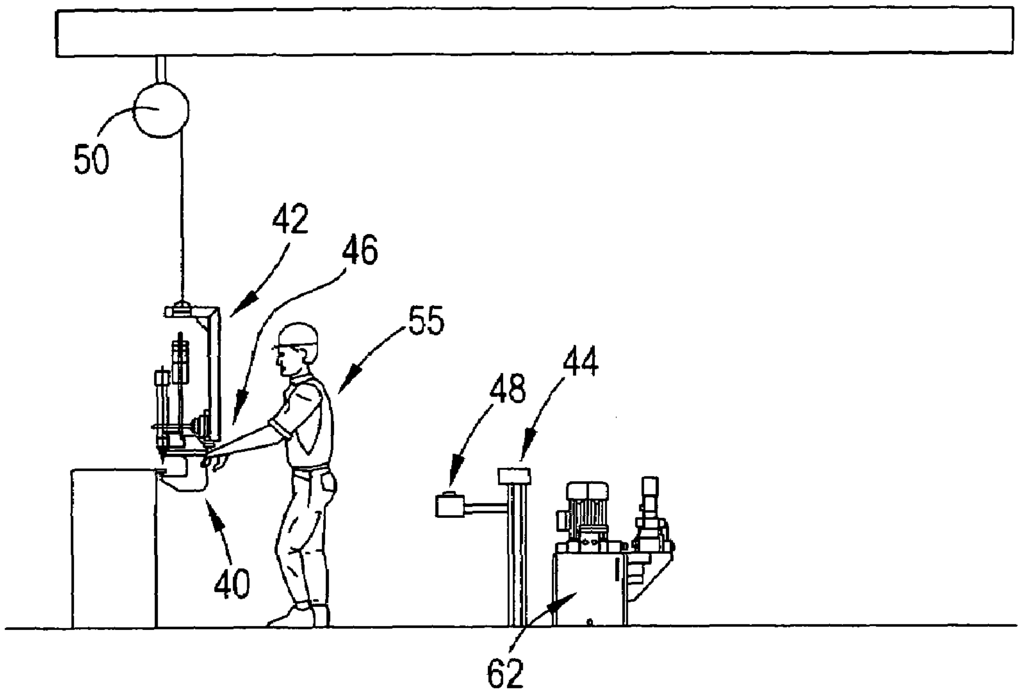
Figure 3:
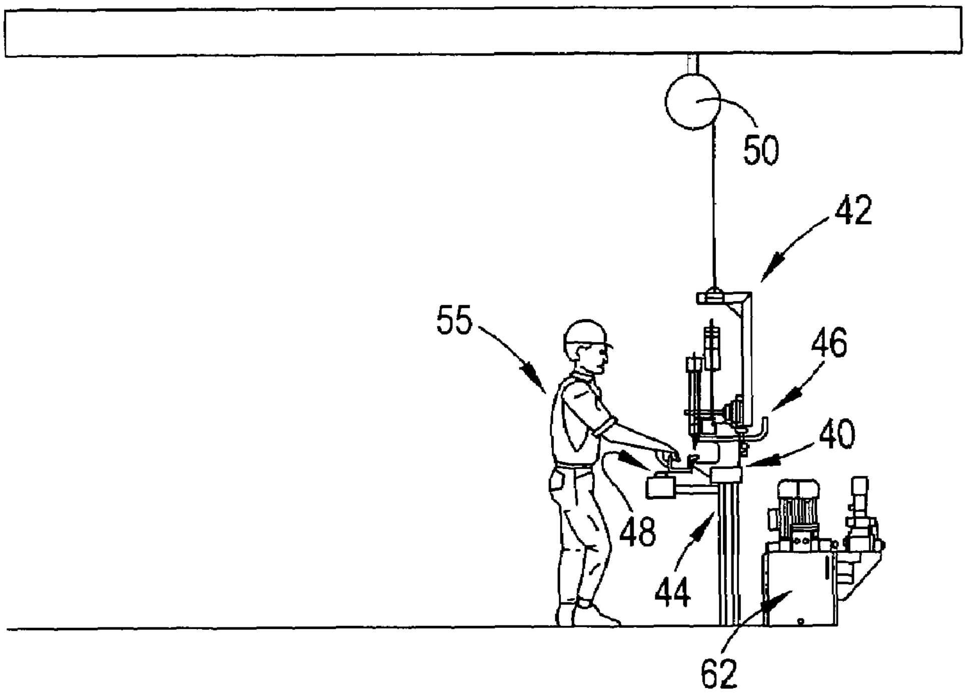
Figure 4:
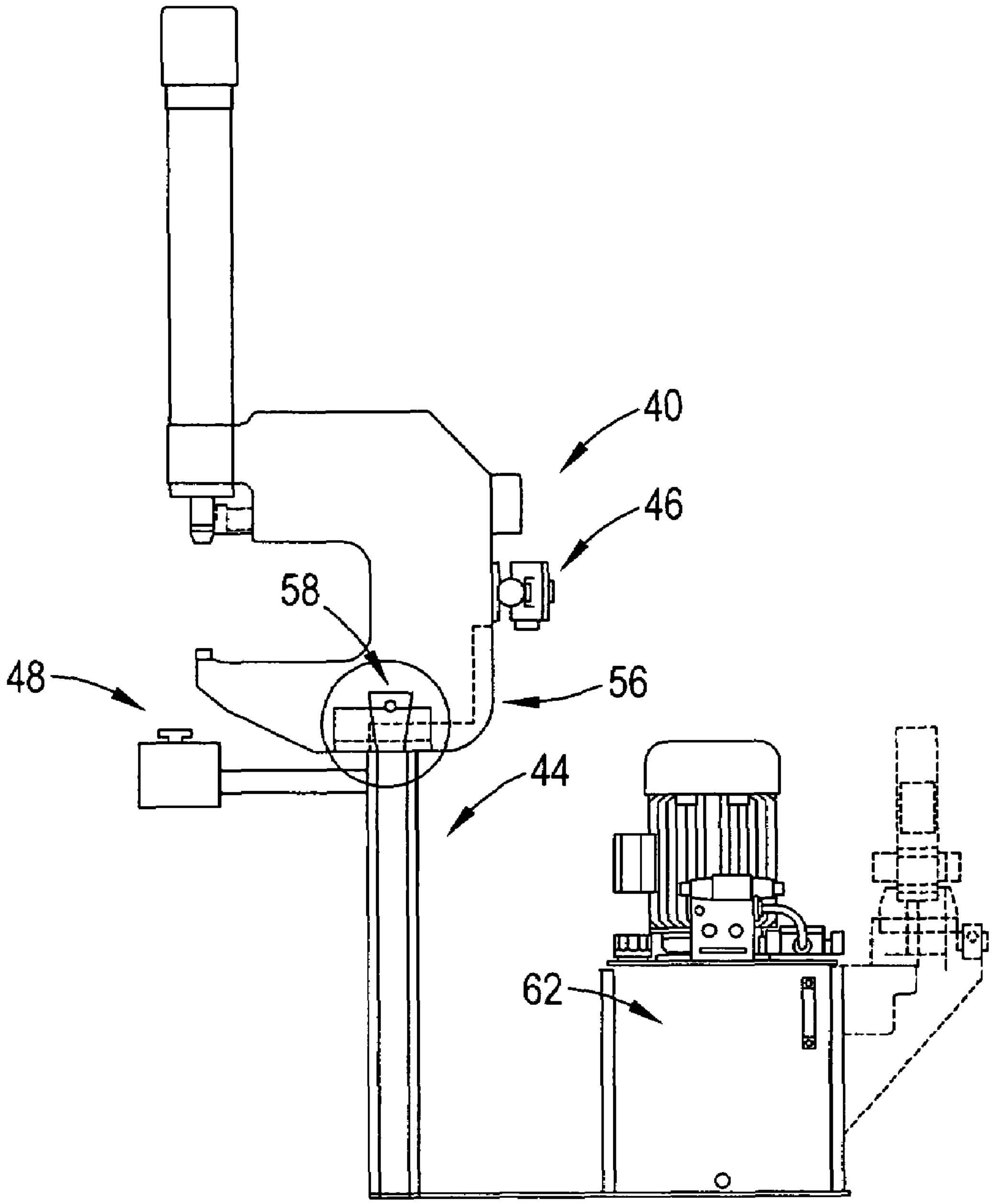
FIG. 4 shows the C-frame mounted on the pedestal.
Figure 6:
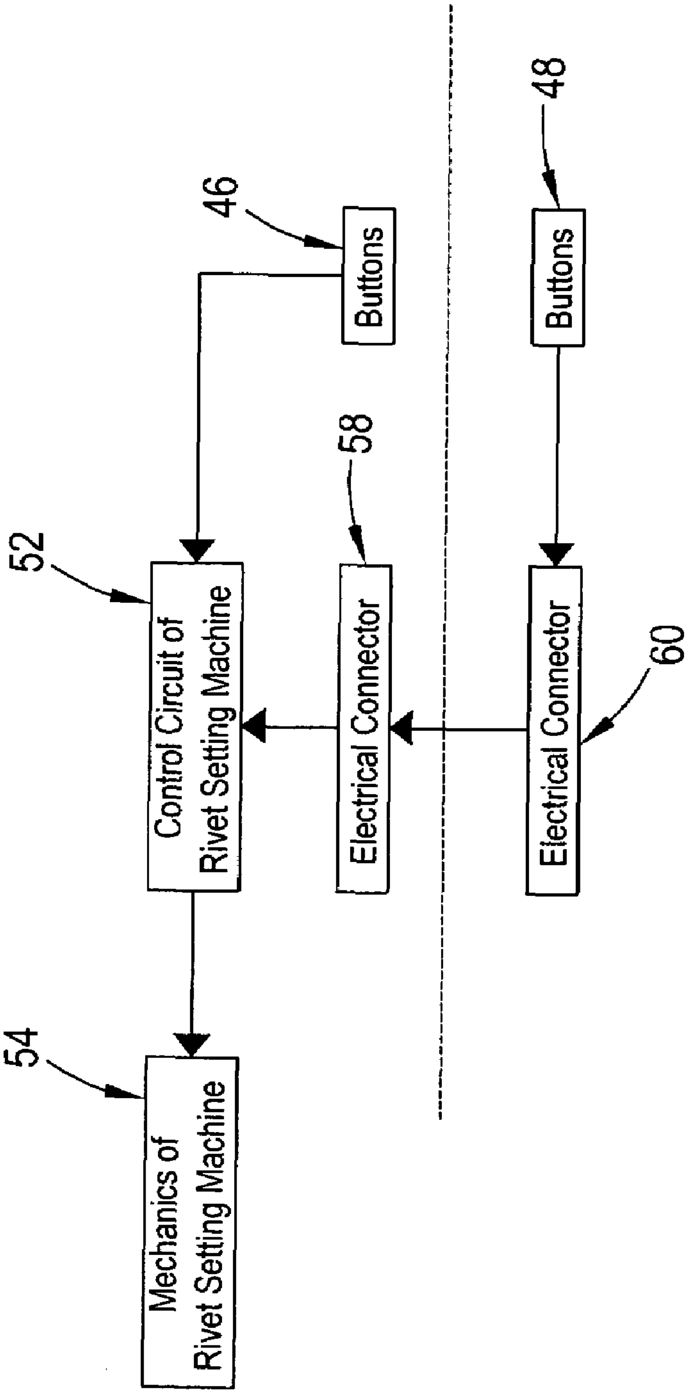
FIG. 6 shows a circuit block diagram relating to the C-frame and pedestal.

A C-frame 40 which is in accordance with an embodiment of the present invention is illustrated in FIGS. 2-4. As shown in FIGS. 2 and 3, the C-frame 40 is part of a rivet setting machine 42 and is suspended from a balancer 50. The C-frame 40 includes controls 46, such as thumb buttons for operating the rivet setting machine 42 and an E-stop button for stopping the rivet setting machine 42 in case of an emergency. As shown in FIG. 6, the controls 46 on the C-frame 40 are electrically connected to a control circuit 52 of the rivet setting machine 42, which in turn is operably connected to, and controls, the mechanics 54 of the rivet setting machine 42 which effects the rivet installation process. In normal use, the operator 55 moves the C-frame 40 from point to point and operates the controls 46 on the C-frame 40 to set fasteners.

Figure 5:
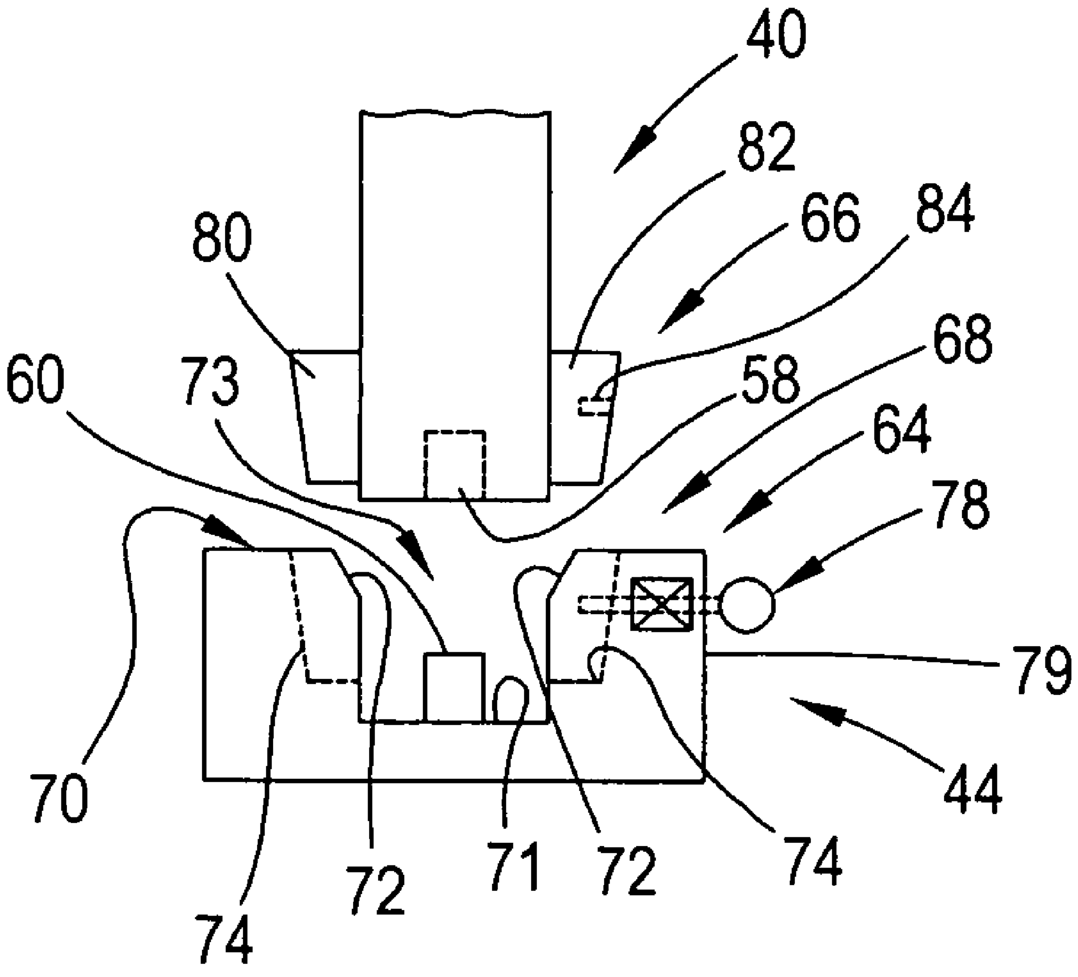
FIG. 5 is a front view of a portion of the C-frame and a portion of the pedestal, wherein said portions generally correspond to each other and allow the C-frame to be mechanically mounted on, and electrically connected to, the pedestal.

When the work piece is too small to move the C-frame 40 around it, the operator 55 can convert the system into a pedestal system. As shown in FIG. 4, on the bottom of the C-frame 40 is a recess 56, and an electrical connector 58 is disposed in the recess 56. Wiring (not shown) in the recess 56 electrically connects the electrical connector 58 to the control circuit 52 of the rivet setting machine 42, as shown in FIG. 6. As best shown in FIGS. 5 and 6, the electrical connector 58 of the C-frame 40 is configured to electrically connect with a corresponding electrical connector 60 which is mounted on the pedestal 44. The control circuit 52 (see FIG. 6) is configured such that when the electrical connector 58 of the C-frame 40 connects with the electrical connector 60 of the pedestal 44, control of the rivet setting machine 42 is effectively transferred from the C-frame mounted controls 46 (i.e., the thumb buttons and an E-stop button) to pedestal mounted controls 48, which preferably consists of similar control buttons, such as two palm buttons and an emergency stop button.

With regard to the pedestal 44, preferably the pedestal 44 is mounted to the side of a power pack/feed unit 62, and is of a height which is determined on project by project basis, but where the goal is to put the work surface at an ergonomic height.

In addition to the electrical connectors 58, 60 as described above, there is also means for mechanically mounting the C-frame 40 to the pedestal 44. Specifically, the top of the pedestal 44 includes a docking mechanism 64, such as a receptacle, that is configured to receive the C-frame 40. Preferably, the interface between the C-frame 40 and the pedestal 44 is configured in such a way as to allow the operator 55 to insert the C-frame 40 into the pedestal 44 with one hand.

The interface mechanism 64 between the C-frame 40 and pedestal 44 consists of two parts, the C-frame portion 66 and the pedestal portion 68. The pedestal portion 68 consists of a U-shaped receiver block 70 that has the electrical connector 60, described above, mounted in the bottom 71 of the "U." The inside, upper edges 72 of the receiver block 70 are chamfered to give the C-frame 40 a lead-in to the mounting slot 73. There are two grooves 74 machined into the side of the receiver block 70 that are used to help align the connectors 58, 60, fore and aft. A spring loaded pin 78 is mounted in one side 79 of the receiver block 70. The pin 78 is used to lock the C-frame 40 to the pedestal 44. The C-frame portion 66 has two lugs 80, 82 mounted on both sides of the C-frame 40. One of the lugs 82 has a hole 84 that is sized to accept the locking pin 78.

In use, the operator 55 uses the suspended system as he or she normally would, as illustrated in FIG. 2, wherein the C-frame 40 is suspended and the operator 55 moves the C-frame 40 from point to point and presses the thumb buttons (i.e., controls 46) to set fasteners.

When the work piece is too small to move the C-frame 40 around it, the operator 55 can convert the system into a pedestal system as illustrated in FIG. 3. To convert over to the pedestal system, the operator 55 moves the C-frame system over the pedestal 44 and lowers it down into the receiver block 70. As the C-frame 40 is lowered down into the receiver block 70, the lead-ins 72 guide the C-frame 40 side to side over the connectors 58, 60. The locking lugs 80, 82 align with the receiving grooves 74 to center the connectors 58, 60, fore and aft. As the C-frame 40 is lowered into the receiver block 70, part of the alignment lug 82 pushes the locking pin 78 out of the way until the C-frame 40 is seated and the electrical connectors 58, 60 are engaged. At this time, the pin 78 (under spring load) falls into the locking hole 84. After the C-frame 40 is locked in place, the control of the system is transferred from the C-frame mounted controls 46 to the pedestal mounted controls 48 (see FIG. 6). Once the conversion is made, the operator 55 places the work piece, as shown in FIG. 3, and operates controls 48 (such as palm buttons) to set the fastener.

As such, the C-frame 40 is configured such that it can be used as a suspended C-frame or as a pedestal mounted C-frame, and can be used by people that have a need for both a pedestal mounted and suspended C-frame system. In other words, the C-frame design provides that one can buy one C-frame system and get the benefits of two—a suspended C-frame system and a pedestal mounted C-frame system.

While an embodiment of the present invention is shown and described, it is envisioned that those skilled in the art may devise various modifications of the present invention without departing from the spirit and scope of the disclosure.

What is claimed is:

1. A C-frame configured for use in association with a fastener setting machine for setting a fastener in a workpiece, and configured for selective use as either a suspended C-frame or a pedestal mounted C-frame, said C-frame comprising: a carrier head configured for holding a fastener; a driver configured for driving the fastener; and anvil for supporting the workpiece while the fastener is being set in the workpiece; and a C-frame body which is configured for selective engagement and disengagement with a pedestal, wherein the C-frame is configured for selective electrical connection and disconnection with the pedestal.

2. A C-frame as recited in claim 1, further comprising buttons which are configured to operate the C-frame unless the C-frame body in engaged with the pedestal.

3. A C-frame as recited in claim 1, wherein the C-frame body includes a docking mechanism which is configured to mechanically lock on and electrically connected with the pedestal.

4. A C-frame as recited in claim 3, wherein the docking mechanism comprises a recess on the C-frame body and an electrical connector in the recess.

5. A C-frame as recited in claim 3, wherein the docking mechanism further comprises at least one lug which is disposed in the recess.

6. A C-frame as recited in claim 1, wherein the C-frame is configured for suspension from a balancer.

7. A C-frame in combination with a pedestal, wherein the C-frame is configured for use in association with a fastener setting machine for setting a fastener in a workpiece, and is configured for selective use as either a suspended C-frame or a C-frame mounted in the pedestal, said C-frame comprising: a carrier head configured for holding a fastener; a driver configured for driving the fastener; an anvil for supporting the workpiece while the fastener is being set in the workpiece; and a C-frame body which is configured for selective engagement and disengagement with the pedestal, wherein the C-frame is configured for selective elective connection and disconnection with the pedestal.

8. A C-frame and pedestal combination as recited in claim 7, said C-frame further comprising buttons which are configured to operated the C-frame unless the C-frame body is engaged with the pedestal.

9. A C-frame and pedestal combination as recited in claim 7, wherein the C-frame body includes a docking mechanism which is configured to mechanically lock on and electrically connected with the pedestal.

10. A C-frame and pedestal combination as recited in claim 9, wherein the docking mechanism comprises a recess on the C-frame body and an electrical connector in the recess.

11. A C-frame and pedestal combination as recited in claim 9, wherein the docking mechanism further comprises at least one lug which is disposed in the recess.

12. A C-frame and pedestal combination as recited in claim 9, wherein the C-frame is configured for suspension from a balancer.

13. A method of using a C-frame configured for use in association with a fastener setting machine for setting a fastener in a workpiece, and configured for selective use as either a suspended C-frame or a pedestal mounted C-frame, said method comprising: providing the C-frame wherein the C-frame comprises a carrier head configured for holding a fastener, a driver configured for driving the fastener, an anvil for supporting the workpiece while the fastener is being set in the workpiece, a C-frame body which in configured for selective engagement and disengagement with a pedestal, and buttons which are configured to operate the C-frame unless the C-frame body is engaged with the pedestal, said method further comprising suspending the C-frame from a balancer; engaging the C-frame with the pedestal; electrically connecting the C-frame to the pedestal; and operating the C-frame as the C-frame is engaged with the pedestal and as the C-frame is suspended from the balancer.

14. A method as recited in claim 13, further comprising using a docking mechanism on the C-frame body to mechanically lock on and electrically connect with the pedestal.

* * * * *